Dec. 22, 1953 V. E. LAGRANGE ET AL 2,663,459
CONTROL APPARATUS FOR DISCHARGE VALVES
Filed July 18, 1949 5 Sheets-Sheet 2
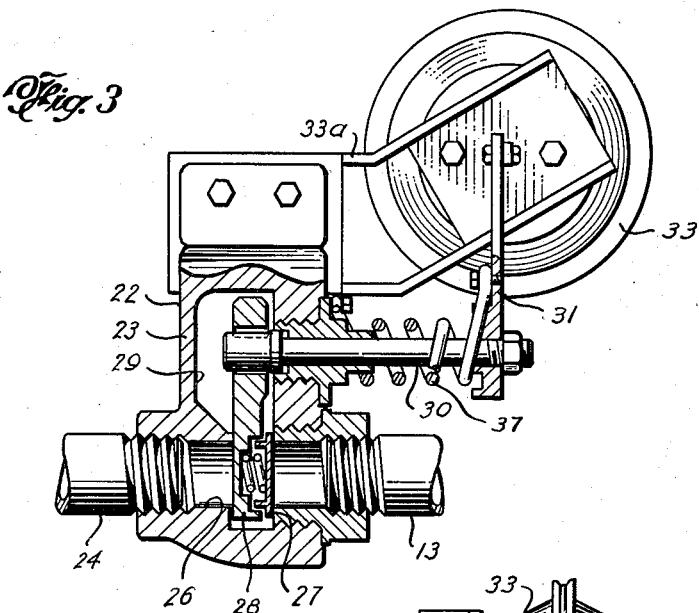
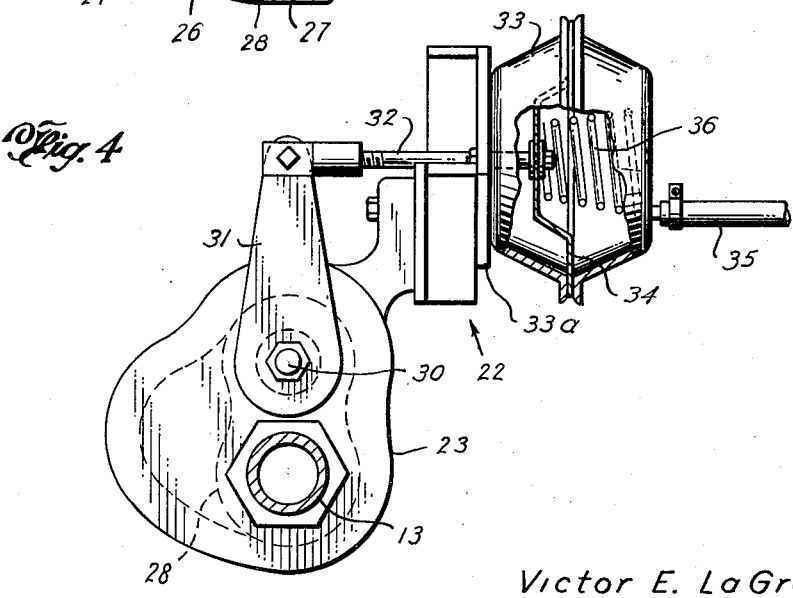
Victor E. LaGrange
Daniel J. Parmesan
INVENTORS
Vincent Martin
and
Joe E. Edwards
ATTORNEYS

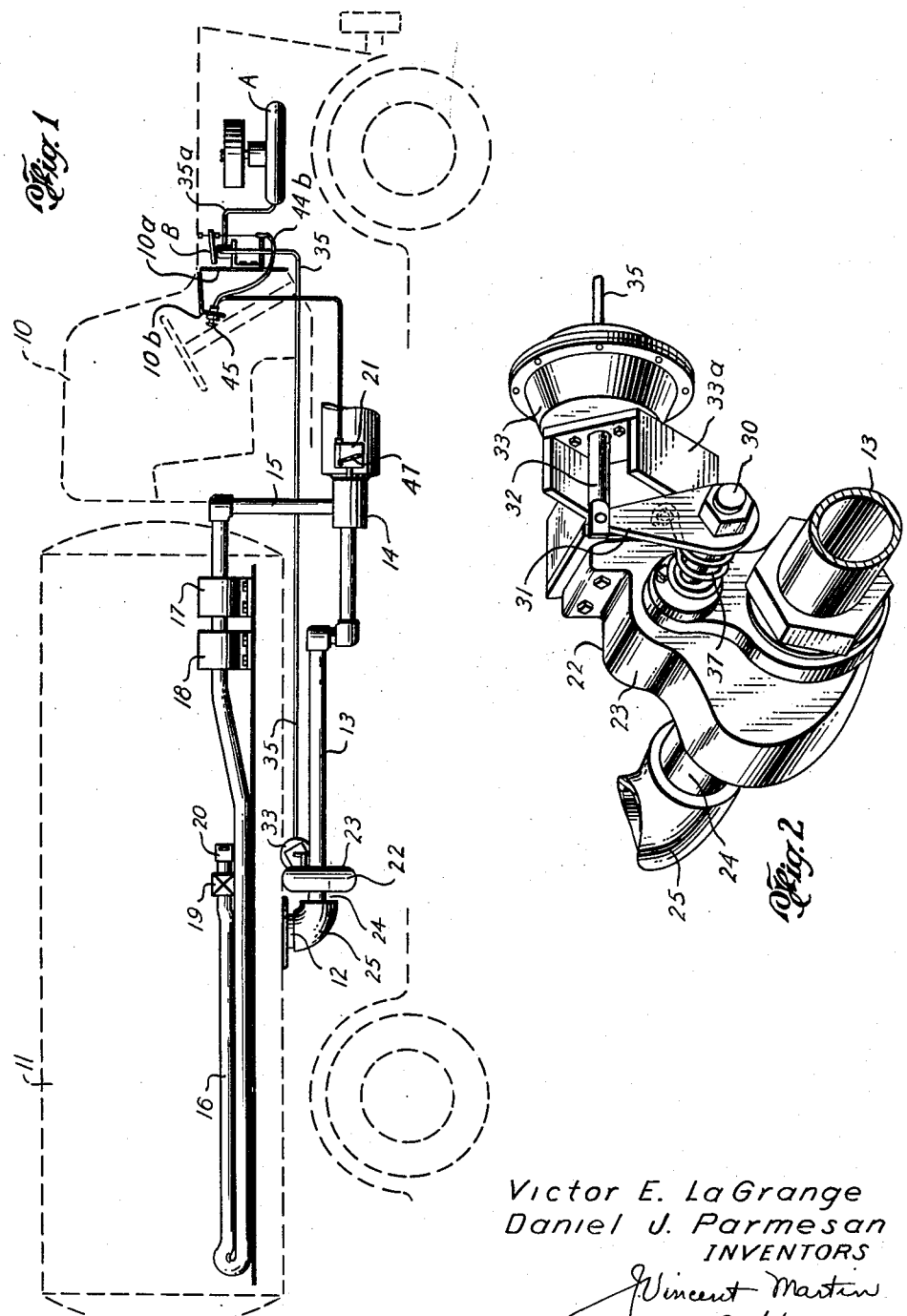

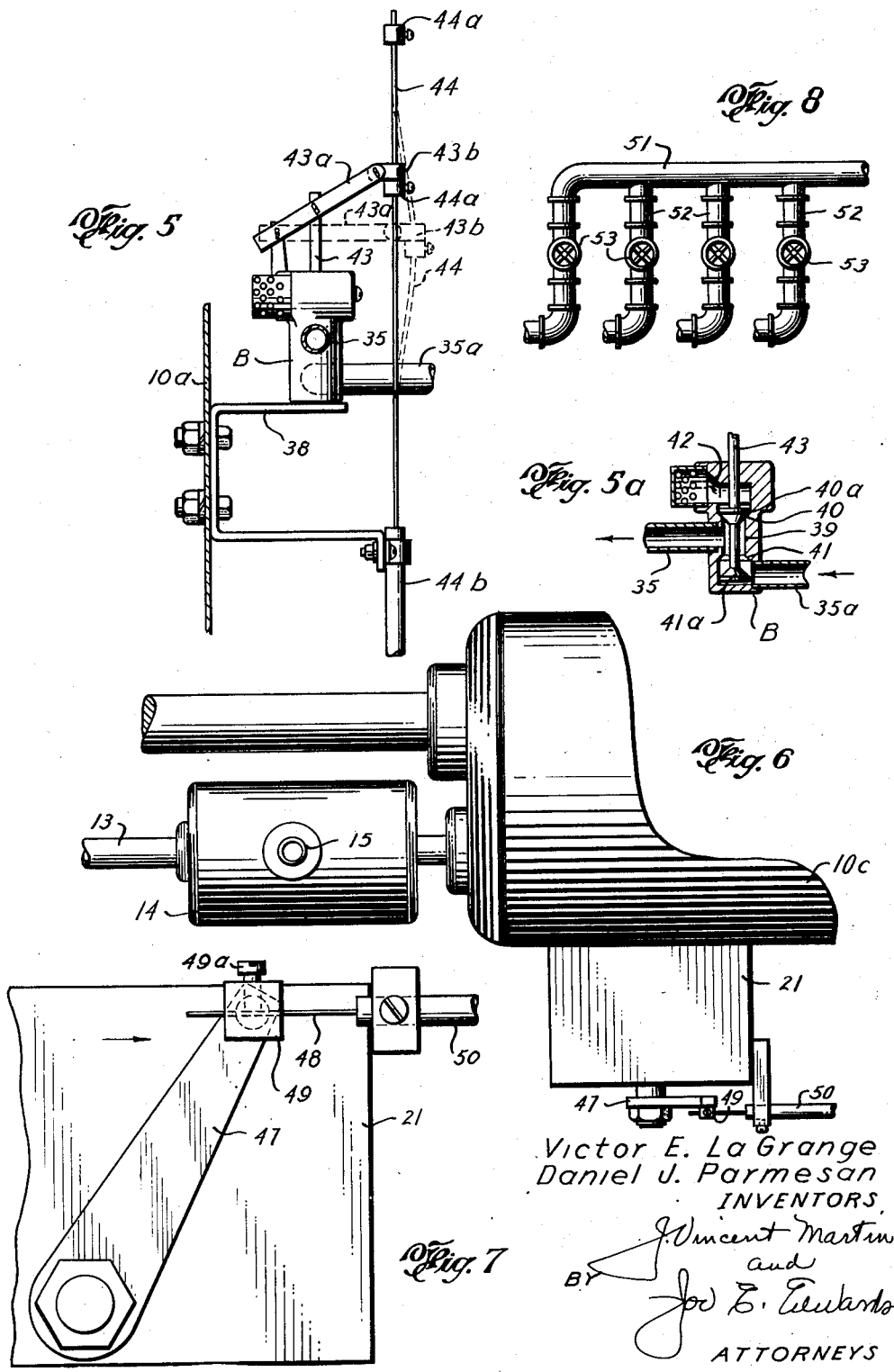

Dec. 22, 1953  V. E. LAGRANGE ET AL  2,663,459
CONTROL APPARATUS FOR DISCHARGE VALVES
Filed July 18, 1949  5 Sheets-Sheet 4
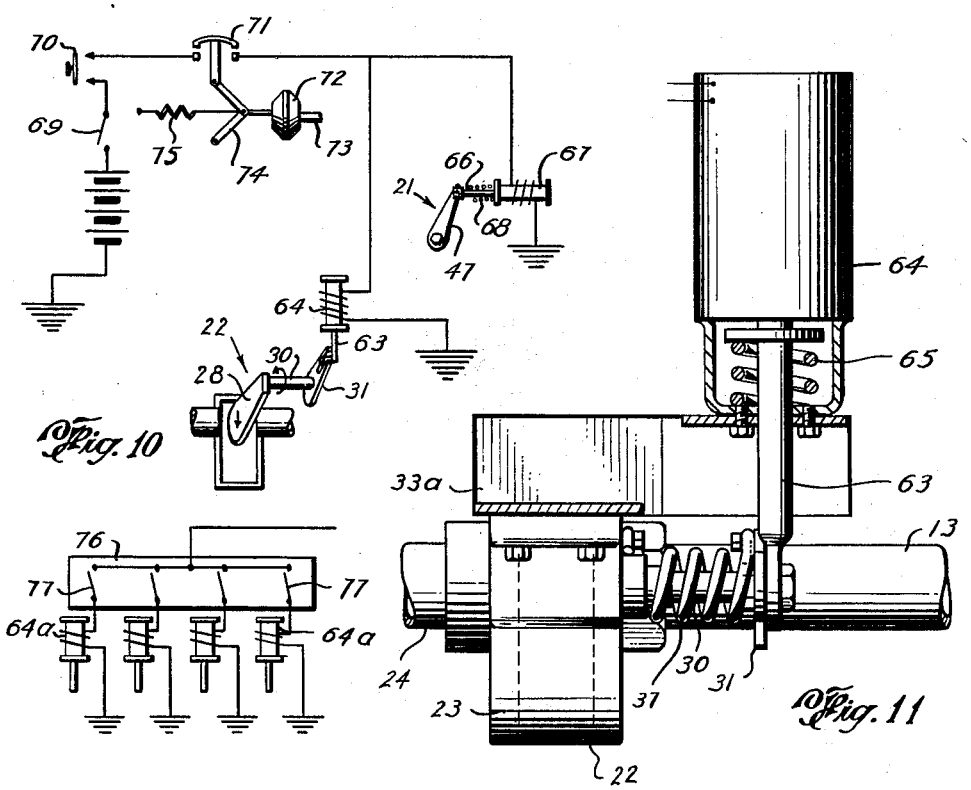
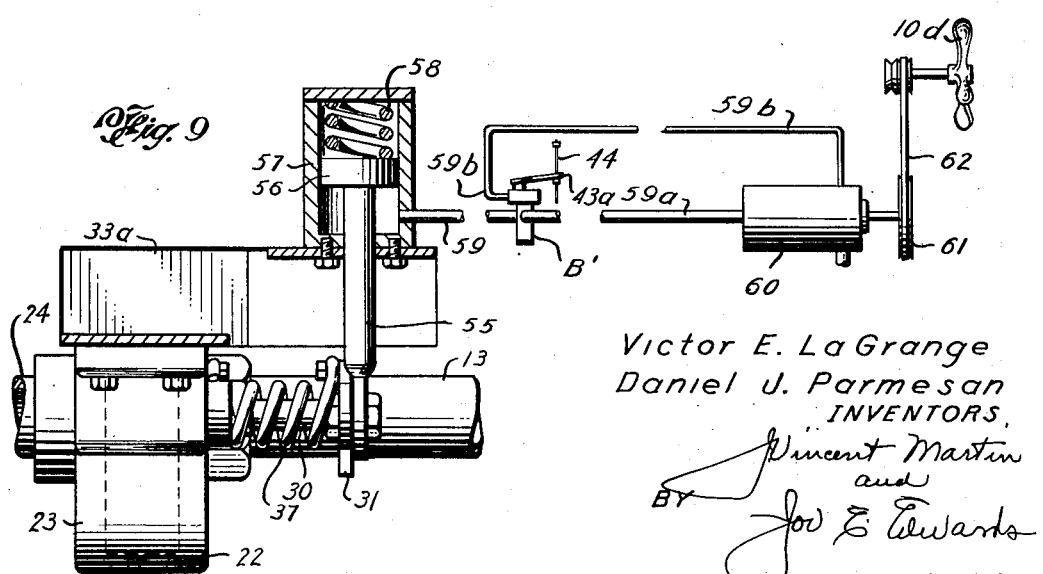
Victor E. LaGrange
Daniel J. Parmesan
INVENTORS.
BY
ATTORNEYS

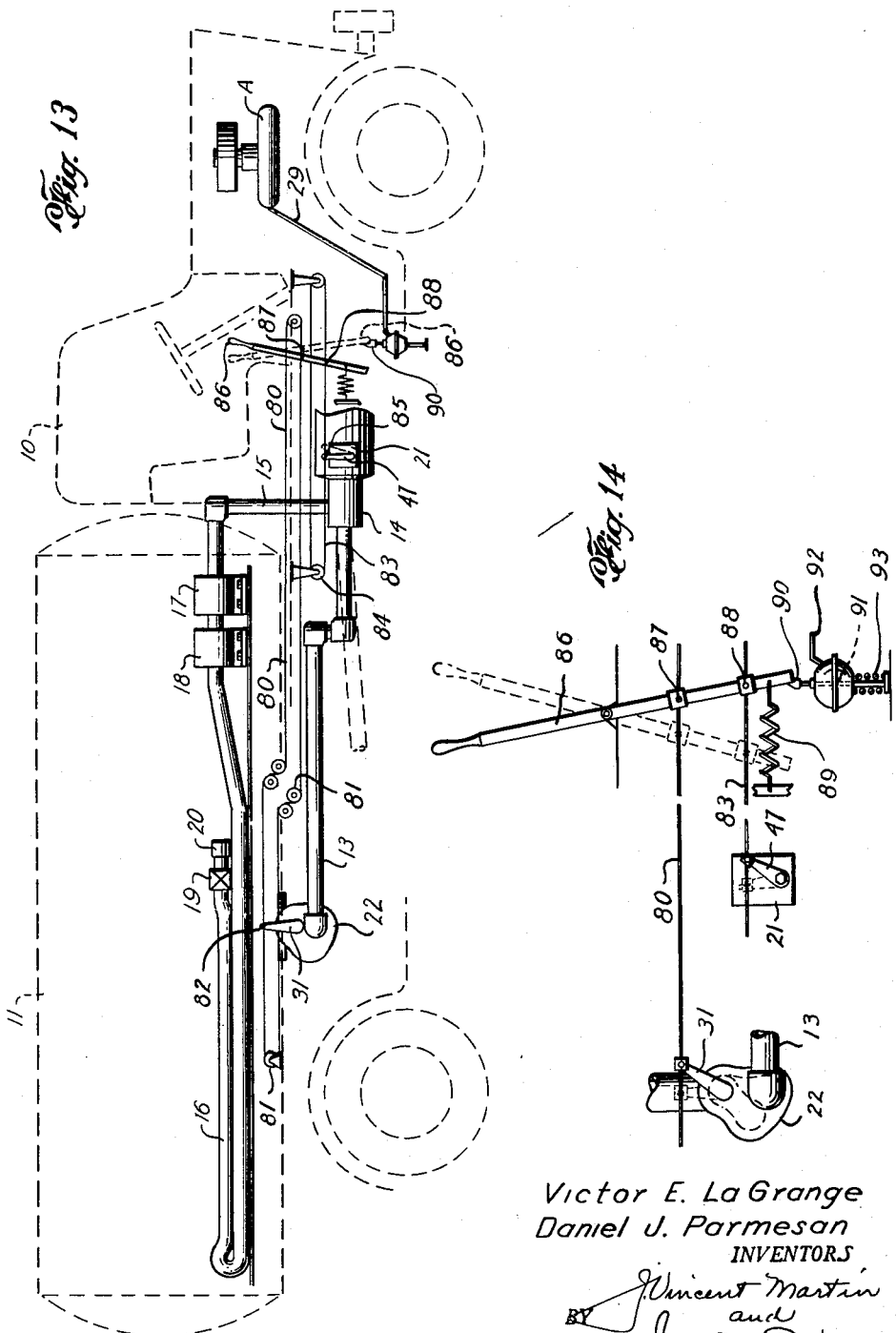

Patented Dec. 22, 1953

2,663,459

UNITED STATES PATENT OFFICE 2,663,459

CONTROL APPARATUS FOR DISCHARGE VALVES

Victor E. Lagrange, Lake Charles, La., and Daniel J. Parmesan, Houston, Tex., assignors, by mesne assignments, to Chiksan Company, Brea, Calif., a corporation of California Application July 18, 1949, Serial No. 105,308

18 Claims. (Cl. 222—52)

1

This invention relates to new and useful improvements in control apparatus for discharge valves. The invention relates particularly to a control apparatus for the main discharge valve of a fluid-transporting vehicle, such as a tank truck.

In the transportation and delivery of fluids, such as butane, propane and the like the usual vehicle or truck is provided with a fluid-containing tank having a main discharge valve for controlling the discharge of fluid from said tank and for safety purposes it is required that this main discharge valve be closed while the vehicle is in transit. The fluid is pumped from the tank as desired by a pump which is actuated by the power take-off of the truck and before discharge of the fluid is possible the main discharge valve must be opened; ordinarily this valve has been manually operated. Not only is manual actuation of the valve of considerable inconvenience to the operator but also the fact that manual operation is depended upon, it many times occurs that the operator overlooks closing said main valve after making a delivery with the result that the vehicle subsequently transports the fluid with only the usual stop cock or hose valve preventing fluid discharge. Under this latter situation, the development of a leak in the discharge hose will result in an undue discharge of fluid as well as the creation of a fire hazard. Another major disadvantage of the present manually-operated main valve is that in the event the vehicle motor or engine should stop for any reason while delivery is being made, the main valve remains open. If the motor is stopped due to fire it is immediately apparent that the open main valve increases the fire and explosion hazard because during the delivery period, the operator is not ordinarily in the immediate vicinity of the vehicle since he is usually attending the discharge hose.

It is, therefore, one object of this invention to provide an improved control apparatus for the main discharge valve of a tank truck or similar vehicle or for the main discharge valve of a bulk plant which will automatically control the opening and closing of the main discharge valve in accordance with operation of the motor and the power take-off of said vehicle or in the case of a bulk plant in accordance with the operation of the motor or operating engine for the pump of said plant, whereby said valve cannot open unless the power take-off is engaged and the motor or engine is operating to assure that said valve may be opened only when delivery is being made.

2

An important object of the invention is to provide a control apparatus for the main discharge valve of the fluid tank of a tank truck, which apparatus has means for automatically closing the discharge valve in the event the vehicle motor stops for any reason during the time that a delivery from the truck is being made.

Still another object is to provide a control apparatus which is completely automatic in operation and which controls actuation of the main discharge valve in such manner that said valve is always closed during normal operation or travel of the vehicle, and may be opened only when the power take-off is engaged and the motor of the vehicle is operating, whereby the human element and dependence upon the operator to open and close said main valve at the proper times is completely eliminated.

A further object is to provide a control apparatus wherein the same manual operating element which engages and disengages the power take-off of the vehicle with the delivery pump is utilized to connect and disconnect the discharge valve with a control unit operated by the vehicle motor, whereby said valve is automatically actuated simultaneously with the power take-off.

Still another object is to provide a control apparatus, of the character described, wherein the main discharge valve may be actuated by the engine vacuum of the motor vehicle engine, or may be actuated by a pressure system operated by said engine, whereby halting of the operation of the engine will automatically effect closure of the valve.

A still further object is to provide a control apparatus wherein electrical means may be employed for operating the main valve or wherein a mechanical means may be used; the apparatus including a means controlled by the vehicle engine for functioning in conjunction with either the electrical or mechanical operating means to assure automatic closing of said main valve in the event that the vehicle engine stops for any reason when said valve is open.

Still another object of the invention is to provide an improved apparatus of the character described, wherein the main discharge valve is actuated in conjunction with the delivery pump whereby said valve is automatically opened when the pump is operated whereby assurance is had that liquid will flow to the pump when the same is actuated to thereby prevent possible damage to the pump by operating the same dry.

A further object of the invention is to provide an apparatus, of the character described, wherein the main discharge valve may be controlled by an engine which also operates the delivery pump, with said engine being either the engine of the vehicle or a separate engine mounted on the vehicle bed.

The invention will be described herein as employed in controlling the main discharge valve of a tank truck but it is pointed out that it may be employed for controlling the discharge valve from a stationary tank or vessel wherein the discharge pump is operated by an engine or motor.

Other and further objects of this invention will appear from the following description.

In the accompanying drawings, which form a part of the instant specification and which are to be read in conjunction therewith and wherein like reference numerals are used to indicate like parts in the various views:

Figure 1 is a view of a control apparatus constructed in accordance with the invention and showing the same applied to the usual tank truck, Figure 2 is an isometric view of the main discharge valve and its actuating unit, Figure 3 is a transverse vertical sectional view taken trough the discharge valve, Figure 4 is an end elevation of the valve and its associated actuating unit, Figure 5 is an enlarged elevation of the vacuum control valve, Figure 5a is a sectional view of said valve, Figure 6 is a partial plan view of the usual power take-off of the motor vehicle or truck, Figure 7 is a partial side elevation of the power take-off actuating unit, Figure 8 is an elevation of a modification of a manifold which is employed on multiple compartment tanks, Figure 9 is a view of a modification partly in section and partly in elevation and illustrating the main discharge valve operated by a pressure, rather than a vacuum means, Figure 10 is a schematic wiring diagram of a modification of the control apparatus with the power take-off and the discharge valve operated electrically, Figure 11 is an enlarged detail of the electrically operated discharge valve, Figure 12 is a wiring diagram of a modification of a selective switch panel which will be employed in multiple compartment tanks when electrical means is utilized to actuate the discharge valve, Figure 13 is a view similar to Figure 1 of a modification illustrating the discharge valve and the power take-off actuated by a mechanical means with the valve closed and the power take-off disengaged, and Figure 14 is a partial elevation showing the apparatus of Figure 13 in a position with the valve open and the power take-off engaged.

In the drawings, the numeral 10 designates an ordinary or usual transport vehicle for transporting fluids or liquids and said vehicle includes the usual fluid tank 11. The tank is mounted on the vehicle or truck bed and in Figure 1 is shown as a single compartment tank having a discharge pipe 12 through which the fluid may be discharged from said tank. An outlet line or conduit 13 is connected with the discharge pipe 12 and extends to the inlet side of a fluid pump 14. When the pump is operated fluid is drawn from the tank through the line 13 and is passed upwardly through a pipe 15 to a flexible delivery hose 16. A suitable filter 17 and meter 18 are connected in the pipe 15. A stop cock 19 is ordinarily mounted in the outer end of the delivery hose 16 and the usual loading end or connection 20 is secured to the end of the hose. The pump 14 is operated through the usual power take-off 21 of the truck and when said pump is actuated, fluid is withdrawn from the tank 11 and is discharged through the delivery hose 16. The foregoing arrangement is usual with fluid transport trucks and the particular details of the pump, filter, meter and delivery hose are, of course, subject to variation.

It has been the practice to connect a main discharge valve in the line 13 and said valve has heretofore been manually operated. In accordance with safety regulations concerning the transporting of butane, propane and other volatile fluids the main discharge valve in line 13 is required to be closed during movement of the vehicle. Because this valve has heretofore been manually operated, the operator must be depended upon to close the valve after each delivery stop and if such main discharge valve is not closed the fluid from the tank may flow into the delivery hose with the stop cock 19 providing the only means for preventing escape of the fluid; it is apparent that the flexible hose is more apt to develop leakage and therefore it is not satisfactory to depend upon the stop cock 19 preventing unintentional discharge of fluid from the tank.

In carrying out the present invention the usual manually operated discharge valve is replaced by a main discharge valve 22 which is connected in the outlet line 13 between the discharge 12 and the pump 14, it being preferable that the valve be disposed adjacent the discharge 12. As illustrated, the valve body 23 has connection through a short nipple 24 and elbow 25 with the discharge pipe. The structure of the discharge valve is clearly shown in Figures 3 and 4 and includes a flow passage 26 in the lower portion of its housing 23, this passage having one end communicating with the discharge pipe 12 with its opposite end communicating with the outlet line 13. An annular valve seat 27 surrounds the flow passage 26 intermediate its ends and a valve member 28 is adapted to engage said seat. The upper portion of the valve member extends upwardly into a cavity 29 in the upper portion of the valve housing and is secured to the end of a rotatable operating shaft 30. When the shaft is rotated the valve member 28 is swung either into alignment with the flow passage 26 to close flow therethrough or out of alignment with said flow passage to permit the fluid from the tank to flow to the outlet pipe 13. It is noted that this type of valve is of usual construction and the invention is not to be limited to any particular type of main discharge valve.

For opening and closing the main discharge valve 22 in accordance with the operation of the motor of the vehicle 10, the outer end of the valve actuating shaft 30 has an operating arm 31 secured thereto. The upper end of the arm is connected to one end of an operating rod 32 which has its opposite end extending into a diaphragm casing 33 and connected with an operating diaphragm 34. The diaphragm casing is supported by means of a bracket 33a, which bracket is fastened to the upper end of the valve housing 23. One side of the diaphragm 34 is exposed through vacuum lines 35 and 35a to the intake manifold A of the engine or motor of the vehicle 10. Although shown as connected to the vehicle engine intake, the lines 35 and 35a may be connected with a separate engine which is sometimes mounted on the truck bed for operating the pump 14.

A vacuum control valve B, which will be hereinafter described, is connected between the lines 35 and 35a and when the engine is operating and the valve B is open the suction is applied to one side of the diaphragm 34. This suction will create a vacuum in one side of the diaphragm casing whereby the operating rod 32 swings the actuating arm 31 and imparts rotation to the valve shaft 30, thereby swinging the valve element 28 to an open position. It is thus apparent that when the vacuum control valve B is open the suction of the engine is utilized to automatically open the discharge valve; if the engine of the vehicle should stop for any reason, the vacuum in the diaphragm casing and acting upon one side of the diaphragm 34 is relieved and a coil spring 36 acting on said diaphragm in a direction opposed to the suction will return the diaphragm to a neutral position which will swing the valve element 28 to a closed position. A torsion spring 37 may surround the shaft 30 of the valve element and constantly exerts its pressure to urge the valve element toward a closed position. It thus becomes obvious that the valve is spring closing and is adapted to be moved to an open position by the vacuum or suction of the vehicle engine or motor. Since both springs 36 and 37 are acting in the same direction, it is apparent that either one may be made of sufficient strength to close the valve element in which the second spring may be omitted.

The vacuum control valve B which is of ordinary construction and which may be purchased on the open market is mounted upon a supporting bracket 38 (Figures 5 and 5a) bolted or otherwise secured to the dashboard 10a of the vehicle. The valve has a central passage 39 having upper and lower valve seats 40 and 41 and the line 35a from the engine suction is connected to the lower end of the passage while the line 35 connects to the passage intermediate the valve seats. An air vent port 42 extends from the upper valve seat and a double valve having an upper valve 40a and a lower valve 41a carried by a single valve stem 43 is movable relative to the seats 40 and 41. The double valve is so arranged that when in a lowered position the upper valve element 40a is seated and the lower valve element 41a is open so that communication between the lines 35 and 35a is had while the air vent port 42 is closed. Raising of the double valve unseats the upper valve 40a and seats valve 41a to close off communication between lines 35 and 35a and at the same time establishing communication between line 35 and atmosphere through the port 42. The valve has the line 35 connected to one side thereof with the line 35a connected to its opposite side whereby said valve will open or close communication between these lines.

The valve stem 43 of the valve B is adapted to be raised and lowered by a pivoted operating lever 43a. For manually swinging the lever 43a the outer end of said lever is formed with a collar 43b through which an operating cable 44 extends. Stop collars 44a are adjustably fastened to the cable 44 and as said cable is moved the stop collars 44a engage the collar 43b to impart a swinging movement to the lever 43a. The operating cable 44 extends through a flexible conduit 44b and is connected to a manually operable hand knob 45 mounted on the instrument panel 10b of the vehicle. The provision of the adjustable collars permit the cable 44 to travel a substantially greater distance than the stroke or travel of the operating lever 43a.

With the parts in the position shown in Figure 5 the vacuum valve B is in a position with the lower valve 41a closed to shut off communication between the lines 35 and 35a and is held so by the engagement of the lower stop collar 44a with the collar 43b. In such position, the motor or engine of the vehicle may be operated without affecting the valve B with the result that the suction cannot pass to the operating diaphragm 34 of the main discharge valve 22 and thus, the vehicle may move in transit without any possibility of the main discharge valve being opened. When the cable 44 is moved downwardly in Figure 5 the upper stop collar 44a engages the collar 43b of the valve lever 43a and moves the valve stem 43 downwardly with the result that the lower valve element 41a of the vacuum control valve B is opened and the upper valve element 40a is closed; if the engine is operating the suction is applied through the lines 35a and 35 to the operating diaphragm 34 of the discharge valve 22 to open said valve. In the event that the engine or motor of the vehicle should stop for any reason whatever while the lever 43a of the vacuum control valve B is in the dotted line position of Figure 5, the suction to the operating diaphragm 34 of the discharge valve 22 is lost and the main valve 22 is closed by the action of the springs 36 and 37.

From the foregoing, it will be seen that the manually controlled cable 44 functions to operate the vacuum control valve B to establish or shut off communication between lines 35 and 35a. When communication between the lines 35 and 35a is established the engine vacuum maintains said valve open so long as the engine is operating and automatically closes said valve if the engine stops.

As illustrated, the main discharge valve is controlled by the vehicle engine and the pump 14 which pumps the fluid through the delivery hose 16 is shown as actuated by the power take-off 21 of the vehicle. If a separate engine is employed for the pump, the main discharge valve will be controlled by the suction of such auxiliary engine. The power take-off illustrated herein has the usual connection with the transmission 10c of the vehicle and its engagement or disengagement is controlled by an actuating arm 47 which when swung is adapted to either engage or disengage said power take-off. When in engaged position the power take-off will drive the pump 14 and when in disengaged position the pump will be idle.

For swinging the actuating arm 47 of the power take-off to control the engagement or disengagement of said power take-off, an operating cable 48 has one end secured to the connecting block 49 which is secured to the upper end of the arm 47. The cable extends through a conduit 50 which has its opposite end connected to the hand knob 45 on the instrument panel of the engine. With this arrangement, a movement of the hand knob simultaneously operates the cable 48 which is connected to the power take-off actuating arm and also operates the cable 44 which controls the vacuum control valve B. The cable 48 has its end adjustably connected to the block 49 and is clamped thereto by a suitable clamping screw 49a and thus, the cable may be connected in various adjusted positions; this adjustment together with the adjustable stop collars 44a on the cable 44 permit proper travel of each cable 48 and 44 by the movement of the single hand knob 45. Actually the stroke of the power take-off arm 47 is greater than the stroke of the valve lever 43a and the arrangement allows both cables to travel the same distances while imparting the required movement to the arm and lever. The cables 44 and 48 are so connected to the vacuum control B and to the power take-off actuating arm 47 that with the knob in its inward position the vacuum valve B is in a closed position shutting off vacuum from the main valve 22 and the actuating arm 47 is in a position disengaging the power take-off 21. At such time the motor vehicle may be operated in a normal manner and the main discharge valve 22 is maintained in a closed position. It is evident that the main discharge valve cannot open until such time as the vacuum control valve B is actuated to establish communication between the lines 35 and 35a. When a delivery is to be made it is necessary that the pump 14 be operated and in order to operate said pump the power take-off 21 must be engaged. As is well known, when the power take-off is engaged it is impossible to drive the vehicle in a normal manner. Thus, when delivery is to be made the hand knob 45 is pulled outwardly with respect to the instrument panel and this imparts movement to the cable 48 which is connected to the power take-off actuating arm 47 and at the same time imparts a movement to the cable 44.

The movement of the control cables 44 and 48 simultaneously engages the power take-off 21 and actuates the vacuum control valve B whereby the engine suction is applied to the operating diaphragm 34 of the main discharge valve 22; at the same time the power take-off 21 is engaged to operate the pump 14 and thus fluid is pumped outwardly or discharged through the flexible hose 16. It is noted that by engaging the power take-off at the same time the main valve is opened said valve is opened at the same time that the pump begins operation and thus damage to the pump, due to its being operated dry, is obviated. The discharge of fluid will continue during the delivery but in the event the engine of the vehicle should unintentionally stop for any reason whatsoever this will result in the loss of engine suction to the operating diaphragm 34 of the main valve and the springs 36 and 37 immediately close said main discharge valve 22.

It might be pointed out that in making the delivery of fluid from a tank truck of the character described, the operator is usually concerned with handling the delivery hose 16 during the delivery period and is not in the immediate vicinity of the vehicle. Therefore, if the engine or motor of the vehicle unintentionally stops operation, the apparatus will immediately and automatically close the main discharge 22 and the fire hazard is greatly reduced.

Assuming that the delivery period is completed without any unintentional halting of the engine operation, the hand knob 45 is again operated to disengage the power take-off through the cable 48 and to simultaneously actuate the vacuum control valve B through the cable 44. Disengagement of the power take-off immediately stops the pump 14 and closure of the vacuum control valve B shuts off the suction being applied to the operating diaphragm 34 of the main discharge valve and simultaneously vents the line 35 to atmosphere, whereby said main valve may close. Because the manual control knob 45 is connected to both the power take-off and the vacuum control valve B it would be impossible to operate the truck or vehicle in transit until the main discharge valve is closed. As has been noted the vehicle cannot be operated in a normal manner with the power take-off engaged and with the arrangement described herein the disengagement of the power take-off also results in a locking of the vacuum control valve B in a position shutting off the suction from the diaphragm 34 of the main valve so that it is assured that the main valve 22 will be closed before the vehicle moves over the road.

As heretofore described, the tank 11 of the vehicle has been indicated as a single compartment tank but in many cases the tank may be subdivided by partitions into several compartments. In such case a manifold 51, as illustrated in Figure 8, would be employed. The branches 52 would extend from each compartment and each branch has a hand valve 53 connected therein for controlling flow from the respective compartment. The manifold 51 will have connection with the outlet line 13 leading to the pump and the main discharge valve 22 is interposed between the manifold 51 and said outlet line. The operation would be exactly as heretofore described except that flow will be selectively from any one of the plurality of compartments.

In Figures 1–7 the main discharge valve 22 has been illustrated and described as operated by means of the engine vacuum through the operating diaphragm 34. However, the valve 22 may be moved to an open position by pressure instead of vacuum and in Figure 9 an arrangement whereby the valve is pressure actuated is shown. Referring to this figure, the operating arm 31 of the valve 22 is connected by a piston rod 55 with a piston 56, said piston being movable within a cylinder 57. A coil spring 58 normally urges the piston in a direction within the cylinder which will swing the valve arm 31 in a direction to close the valve element 28. When pressure is applied to that side of the piston 56 which is opposite the spring the piston is moved in a direction to open the valve element 28.

For applying a pressure to the end of the cylinder 57 a pressure line 59 is connected therein and this line extends through a pressure control valve B' which is somewhat similar in construction to the control valve B. A pressure line 59a extends from the vacuum control valve B' to a pressure pump and reservoir 60, which pump is actuated by a pulley 61 and belt 62 which are driven from the fan 10d of the motor vehicle engine. A relief or by-pass line 59b extends from the vent passage 42 of the pressure control valve B' to the intake side of the pump and reservoir 60 and the cable 44 heretofore described actuates the lever 43a of the valve B'. The pump 60 is constructed so that its moving parts are provided with a by-pass clearance and when the engine is operating with the valve B' closed there is merely a by-pass of fluid through the pump. At such time the main discharge valve 22 will be closed.

When the cable 44 is operated through the hand knob 45 to actuate the pressure control valve B' to establish communication between lines 59 and 59a, pressure is applied through said lines to the piston 56 and the main valve 22 is opened. It is noted that in this form the power take-off 21 which is not illustrated in Figure 9 will be simultaneously actuated through its cable 48 and thus the control valve B' is opened simultaneously with the engagement of the power take-off means. If the engine should stop for any reason during the delivery period the pump stops and no pressure is applied to the piston 56 whereby the spring 58 as well as the spring 37 surrounding the operating shaft 30 of the main valve may close the main valve element 28. Any pressure fluid in the line 59 and 59a are forced back into the reservoir through the clearances around the parts of the pump. Just as in the first form, the cable 44 may be utilized to actuate the valve B' to shut off pressure to the piston 56 while the engine of the vehicle is operating in transit.

In some instances, it may be desirable to actuate the main discharge valve and the power take-off 21 by electrical means and in such case an electrical mechanism, as illustrated in Figure 10, may be employed. In this case the actuating arm 31 of the main discharge valve 22 is connected with a movable rod 63 which may form the core of an electrical solenoid 64. A coil spring 65 normally urges the rod 63 in a direction maintaining the main valve closed and when the solenoid 64 is energized the rod 63 is moved in an opposite direction to open the main valve. The actuating arm 47 which controls the engagement or disengagement of the power take-off is connected to a rod 66 which has connection with the core of a second solenoid 67. A coil spring 68 normally urges the rod 66 and actuating arm 47 in a direction disengaging the power take-off 21. When the solenoid 67 is energized the rod 66 is attracted and moved in a direction to engage the power take-off.

The solenoids 64 and 67 are connected in the electrical circuit of the ignition system of the motor vehicle and the ignition switch 69 is schematically illustrated in Figure 10. In addition to the switch a control button switch 70 is connected in the circuit and this button may be on the instrument panel 10b of the vehicle. A safety switch 71 is also connected in the circuit and is normally maintained in a closed position by a vacuum operated diaphragm 72, which diaphragm has one side exposed through a line 73 to the intake manifold of the engine. The diaphragm is connected to the switch through a suitable linkage 74 and a coil spring 75 normally acts in a direction opposite to the suction to which the diaphragm is subjected.

With the ignition switch 69 closed and the engine operating, the vacuum acting on the diaphragm 72 holds the switch 71 closed. However, at this time the control switch 70 is open and solenoids 64 and 67 are de-energized whereby the main discharge valve 22 is closed with the power take-off 21 disengaged. When a delivery is to be made the control button switch 70 is depressed to close the circuit to the solenoids 64 and 67 and this results in an opening of the main discharge valve and engagement of the power take-off. So long as the motor or engine of the vehicle continues to operate, the suction acting on the diaphragm 72 holds the switch 71 closed and the solenoids remain energized; however, if the motor or engine should stop the coil spring 75 will immediately open the switch 71 to de-energize the solenoids 64 and 67 and thereby close the main discharge valve and disengage the power take-off. If the motor or engine continued to run throughout the delivery period the circuit to the solenoids 64 and 67 is manually opened by operating the control button 70 and at such time the discharge valve is closed simultaneously with disengagement of the power take-off.

In the event that an electrically operated apparatus is employed with a multiple compartment tank then an additional switch panel 76 as illustrated in Figure 12 is employed. This switch panel includes a plurality of switches 77, each of which is associated with a solenoid 64a and each solenoid 64a is associated with the outlet valve for each compartment. Opening of all but one of the switches will close the electrical circuit to one of the discharge valves for one of the compartments and when the control button 70 is actuated the discharge valve for a particular compartment will be opened. The solenoid 64a associated with the discharge valves of the other compartments will not be affected since their respective switches will be in an open position. The switches 77 are manually actuated to permit selective discharge from any desired compartment of the tank.

The feature of the present invention resides in the fact that the main discharge valve 22 is simultaneously opened with the engagement of the power take-off and is simultaneously closed when the power take-off is disengaged. During the period that the main discharge valve is open the arrangement is such that the engine of the vehicle will control the position of the discharge valve and so long as the engine operates said main discharge valve remains open. However, if the engine should stop during the delivery period the main discharge valve is automatically closed.

Another modification of the invention is illustrated in Figures 13 and 14 wherein the main valve 22 and the power take-off 21 are controlled solely by mechanical means. In this instance an endless cable 80 which is supported on suitable pulleys 81 is connected at 82 to the actuating arm 31 of the main discharge valve. A second endless cable 83 supported on suitable pulleys 84 is connected at 85 to the actuating arm 47 of the power take-off. A pivoted hand lever 86 is arranged to have its lower portion connected at 87 to the cable 80 and at the point 88 to the cable 83 and a coil spring 89 constantly exerts its pressure to urge the lever 86 in a direction which will move the valve 22 to a closed position and which will disengage the power take-off. When the lever 86 is moved to the dotted line position shown in Figure 13 the cables 80 and 83 function to open the main valve 22 and to engage the power take-off mechanism.

For latching the hand lever 86 in its dotted line position in Figure 13 or its full line position in Figure 14 maintaining the valve open and the power take-off engaged, a spring pressured latching pawl 90 is adapted to engage the extreme lower end of said lever. This pawl normally is held in a lifted or raised position by a diaphragm 91 which has its upper end exposed through a suction line 92 to the intake manifold of the motor of the vehicle. Thus, so long as the motor or engine of the vehicle is operating the lever 86 is latched in the position shown in Figure 14 and the main discharge valve is open with the power take-off in engaged position. If the operation of the engine is halted the suction acting on the upper surface of the diaphragm 91 is relieved and a coil spring 93 immediately moves the diaphragm, as well as the pawl 90 connected thereto downwardly out of the path of the lower end of the hand lever 86. The coil spring 89 then swings the hand lever back to its full line position shown in Figure 13 to actuate the cables 80 and 83 to close the main discharge valve and disengage the power take-off. If the engine or motor operates properly during the delivery period the locking pawl may be depressed by suitable manual means such as a foot pedal or if desired the vacuum control valve B controlled by the cable 44 may be mounted in the line 92; release of the pawl permits release of the hand lever 86 to close the valve and disengage the power take-off.

In all forms of the invention the main discharge valve is adapted to be actuated simultaneously with the operation of the discharge pump. As illustrated, the pump is actuated by the power take-off with the vehicle engine controlling the main valve but it is apparent that the invention may be applied to an auxiliary engine if such is used for actuating said pump. In this manner, the valve cannot be opened until the pump is operated and similarly will always be closed when the pump is shut off at the end of the delivery period. The provision is made in all forms for a control actuated by an engine whereby in the event said engine is unintentionally halted during the delivery period the main discharge valve is closed. When the pump is actuated by the power take-off of the vehicle with the main valve controlled by the vehicle engine, the motor vehicle cannot be operated in a normal manner unless the power take-off is disengaged and since the main discharge valve is always closed upon disengagement of the power take-off it becomes evident that any time the vehicle is moving in a normal manner the main discharge valve must be closed. It is apparent that the operation is substantially automatic and the human element with respect to control of the main discharge valve is completely eliminated.

The particular power take-off actuating mechanism which is illustrated is cable-actuated but some types of vehicles provide a lever for engaging and disengaging the power take-off. It is obvious that the present invention is applicable to the lever-actuated power take-off mechanisms for in such case, the control cable 44 which operates the control valve B or B' will be connected to the lever, whereby actuation of the control valve is accomplished simultaneously with operation of the power take-off. It is noted that the various forms of the invention as disclosed herein may be interchangeably used, that is, the valve B may be cable-actuated with the power take-off electrically controlled or the power take-off may be pressure-operated while the valve B is electrically operated; obviously, any one of a number of combinations may be employed within the scope of the invention.

From the foregoing, it will be seen that this invention is one well adapted to attain all of the ends and objects of the invention hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, we claim:

1. The combination with a motor vehicle having an engine-actuated delivery pump and also having a tank provided with a main discharge valve for controlling the discharge of fluid from said tank of a control apparatus including, actuating means connected with the discharge valve for controlling operation thereof, actuating means connected with the engine for operating the pump, a single manually-operated element having connection with the valve actuating means and with the pump actuating means for simultaneously opening the discharge valve and operating the pump and for simultaneously closing the discharge valve and discontinuing operation of the pump, and means independent of the manually operated element and controlled by the engine which operates the pump for closing the discharge valve in the event that the operation of the engine is halted.

2. A control apparatus for the main discharge valve of the fluid tank of a transport motor vehicle wherein the vehicle is provided with a fluid discharge pump adapted to be operated by the power take-off of the vehicle, said apparatus including, a vacuum-operated actuating unit connected with the discharge valve for opening said valve when suction is applied to said unit, and for closing the valve when the suction is released, a vacuum line extending from the suction side of the motor to said unit whereby the motor vacuum is utilized to open the discharge valve, a control valve mounted in the connection between the actuating unit and the motor and exposed to the motor vacuum which holds said valve open when the engine is operated, and which automatically closes the discharge valve when the motor stops, and a manual control means connected with the control valve for manually closing said valve independently of the motor suction to permit operation of the motor while the discharge valve is closed.

3. A control apparatus for the main discharge valve of the fluid tank of a transport motor vehicle wherein the vehicle is provided with a fluid discharge pump adapted to be operated by the power take-off of the vehicle, said apparatus including, a vacuum-operated actuating unit connected with the discharge valve for opening said valve when suction is applied to said unit, and for closing the valve when the suction is released, a vacuum line extending from the suction side of the motor to said unit whereby the motor vacuum is utilized to open the discharge valve, a control valve mounted in the connection between the actuating unit and the motor and exposed to the motor vacuum which holds said valve open when the engine is operated, and which automatically closes the discharge valve when the motor stops, actuating means for engaging and disengaging the power take-off, a manual control element connected to said actuating means, and means connecting the control element with the control valve, whereby the control valve is released for opening movement by the motor vacuum simultaneously with engagement of the power take-off and is closed simultaneously with the disengagement of said power take-off.

4. A control apparatus for the main discharge valve of the fluid tank of a transport motor vehicle wherein the vehicle is provided with a fluid discharge pump adapted to be operated by the power take-off of the vehicle, said apparatus including, a pressure-operated actuating unit connected with the discharge valve for opening said valve when pressure is applied thereto and for closing said valve when the pressure is released, a source of fluid pressure, a pressure line connecting the pressure source to the valve actuating unit, actuating means for engaging and disengaging the power take-off, a manual control element connected with the power take-off actuating means for operating the same, a control valve mounted in the pressure line exposed to the motor vacuum and adapted to be held in an open position when the motor is operated and to be closed when the motor stops, and means for connecting said control valve with the manual control element, whereby the control valve is moved into a position which will allow the motor vacuum to open the same simultaneously with engagement of the power take-off and is closed simultaneously with disengagement of said power take-off.

5. A control apparatus for the main discharge valve of the fluid tank of a transport motor vehicle wherein the vehicle is provided with a fluid discharge pump adapted to be operated by the power take-off of the vehicle, said apparatus including, a single control element, mechanical means connecting the element to the discharge valve to open and close the same, a mechanical connection between the control element and the power take-off, said connections permitting the single control element to open the discharge valve simultaneously with the engagement of the power take-off and to close said valve upon disengagement of said power take-off, and vacuum operated means controlled by the vacuum of the vehicle motor for holding the control element and its associated connections in a position maintaining the discharge valve open and the power take-off engaged so long as said motor is operating, said vacuum operated means functioning to allow movement of the control element and associated connections to effect closure of the discharge valve and disengagement of the power take-off in the event that the motor of the vehicle stops.

6. A control apparatus for a fluid containing tank having a discharge line extending therefrom and also having a main discharge valve and a discharge pump connected in said line, with a prime mover for actuating said discharge pump, said apparatus including, a vacuum-operated actuating unit connected with the discharge valve for opening said valve when suction is applied to the unit and for closing the valve when the suction is released, a vacuum line extending from the suction side of the prime mover which operates the pump to said unit, whereby the prime mover vacuum is utilized to open the discharge valve, a control valve mounted in the connection between the actuating unit and the prime mover and exposed to the prime mover vacuum which holds said discharge valve open when the prime mover is operating and which automatically closes the discharge valve when the prime mover operation is halted, actuating means for the pump adapted to be connected with and disconnected from the prime mover, a manual control element connected to said actuating means for controlling its actuation, and means for connecting the control element with the control valve, whereby the control valve is released for opening movement by the prime mover vacuum simultaneously with connection of the actuating means with the prime mover and is simultaneously closed with the disengagement of said actuating means with the prime mover.

7. As a sub-combination in a control apparatus for controlling the discharge of fluid through a discharge line of a vessel, a discharge valve including, a casing adapted to be connected in the line and having a passage extending therethrough communicating with said line, a rotatable shaft extending into the casing, a valve member mounted on said shaft within the casing and having a portion thereof movable into and out of alignment with the passage to control flow therethrough, the shaft projecting outwardly from the casing and having an actuating arm at its outer end, and a spring surrounding the shaft and having one end secured to the actuating arm with its opposite end secured to the casing, whereby the force of the spring in torsion urges the valve member in one direction within the casing.

8. The sub-combination set forth in claim 7, together with an operating diaphragm connected with the actuating arm, whereby pressure or suction may be utilized to swing the arm and valve member against the torsional force of said spring.

9. The combination with a motor vehicle having an engine-actuated delivery pump and also having a tank provided with a main discharge valve for controlling the discharge of fluid from said tank of a control apparatus including, actuating means connected with the discharge valve for controlling operation thereof, actuating means connected with the engine for operating the pump, a single manually-operated element having connection with the valve actuating means and with the pump actuating means for simultaneously opening the discharge valve and operating the pump and for simultaneously closing the discharge valve and discontinuing operation of the pump, the valve actuating means being vacuum operated, and said valve-actuating means being connected with the engine which actuates the pump, whereby the discharge valve may be opened only when the engine is operating to actuate the pump and is automatically closed when said engine stops.

10. The combination with a motor vehicle having an engine-actuated delivery pump and also having a tank provided with a main discharge valve for controlling the discharge of fluid from said tank of a control apparatus including, actuating means connected with the discharge valve for controlling operation thereof, actuating means connected with the engine for operating the pump, a single manually-operated element having connection with the valve actuating means and with the pump actuating means for simultaneously opening the discharge valve and operating the pump and for simultaneously closing the discharge valve and discontinuing operation of the pump, the valve-actuating means being pressure-actuated, and the pressure for operating said valve-actuating means being provided by a pressure system operated by the engine of the motor vehicle, whereby the discharge valve may be opened only when the vehicle engine is operating and is automatically closed when said engine stops.

11. The combination with a motor vehicle having an engine-actuated delivery pump and also having a tank provided wtih a main discharge valve for controlling the discharge of fluid from said tank of a control apparatus including, actuating means connected with the discharge valve for controlling operation thereof, actuating means connected with the engine for operating the pump, a single manually-operated element having connection with the valve actuating means and with the pump actuating means for simultaneously opening the discharge valve and operating the pump and for simultaneously closing the discharge valve and discontinuing operation of the pump, the valve-actuating means being electrically operated, and the electrical circuit including a normally closed switch means controlled by the operation of the engine which actuates the pump, whereby in the event the engine is not operating the discharge valve is automatically closed.

12. A control apparatus for the main discharge valve of the tank of a transport motor vehicle wherein the vehicle is provided with a power take-off for actuating a discharge pump to deliver fluid from the tank, said apparatus including, actuating means connected with the discharge valve for operating the same, actuating means for connecting and disconnecting the power take-off to control operation of the pump, a manual control element connected with the power take-off actuating means for operating the same, and means also connected to the manual control element and associated with the valve actuating means for opening the discharge valve simultaneously with the connection of the power take-off whereby the valve is opened when the discharge pump is actuated, said last-named means also functioning to close the discharge valve simultaneously with the disconnection of the power take-off, said means associated with the valve-actuating means being operated by the motor of the vehicle, whereby the discharge valve is automatically closed independently of the manual control element in the event that operation of the motor is halted.

13. A control apparatus for the main discharge valve of the tank of a transport motor vehicle wherein the vehicle is provided with a power take-off for actuating a discharge pump to deliver fluid from the tank, said apparatus including, actuating means connected with the discharge valve for operating the same, actuating means for connecting and disconnecting the power take-off to control operation of the pump, a manual control element connected with the power take-off actuating means for operating the same, and means also connected to the manual control element and associated with the valve actuating means for opening the discharge valve simultaneously with the connection of the power take-off whereby the valve is opened when the discharge pump is actuated, said last-named means also functioning to close the discharge valve simultaneously with the disconnection of the power take-off, said means associated with the valve-actuating means being a vacuum operated member actuated by the motor of the vehicle and functioning to automatically close the discharge valve when the operation of the motor is halted.

14. A control apparatus for the main discharge valve of the tank of a transport motor vehicle wherein the vehicle is provided with a power take-off for actuating a discharge pump to deliver fluid from the tank, said apparatus including, actuating means connected with the discharge valve for operating the same, actuating means for connecting and disconnecting the power take-off to control operation of the pump, a manual control element connected with the power take-off actuating means for operating the same, and means also connected to the manual control element and associated with the valve actuating means for opening the discharge valve simultaneously with the connection of the power take-off whereby the valve is opened when the discharge pump is actuated, said last-named means also functioning to close the discharge valve simultaneously with the disconnection of the power take-off, the discharge valve-actuating means being vacuum operated and being connected to the suction side of the motor of the vehicle, and said means associated with the valve-actuating means being a vacuum valve mounted within the connection between the discharge valve-actuating means and the motor, said vacuum valve being opened and closed by the manual control element when the motor of the vehicle is operating and being adapted to be closed independently of the control element to shut off the vacuum to the valve actuating means of the discharge valve in the event operation of the motor is halted.

15. A control apparatus for the main discharge valve of the tank of a transport motor vehicle wherein the vehicle is provided with a power take-off for actuating a discharge pump to deliver fluid from the tank, said apparatus including, actuating means connected with the discharge valve for operating the same, actuating means for connecting and disconnecting the power take-off to control operation of the pump, a manual control element connected with the power take-off actuating means for operating the same, and means also connected to the manual control element and associated with the valve actuating means for opening the discharge valve simultaneously with the connection of the power take-off whereby the valve is opened when the discharge pump is actuated, said last-named means also functioning to close the discharge valve simultaneously with the disconnection of the power take-off, the discharge valve-actuating means being pressure-actuated by a source of pressure developed by the operation of the motor of the vehicle, and said means associated with the valve-actuating means being a vacuum-operated valve mounted within the connection between the discharge valve-actuating means and the pressure source, said vacuum-operated valve being opened and closed by the manual control element when the motor of the vehicle is operating and being adapted to be closed independently of the control element to shut off the pressure to the valve-actuating means of the discharge valve in the event the operation of the motor is halted.

16. A control apparatus for the main discharge valve of the tank of a transport motor vehicle wherein the vehicle is provided with a power take-off for actuating a discharge pump to deliver fluid from the tank, said apparatus including, actuating means connected with the discharge valve for operating the same, actuating means for connecting and disconnecting the power take-off to control operation of the pump, a manual control element connected with the power take-off actuating means for operating the same, and means also connected to the manual control element and associated with the valve actuating means for opening the discharge valve simultaneously with the connection of the power take-off whereby the valve is opened when the discharge pump is actuated, said last-named means also functioning to close the discharge valve simultaneously with the disconnection of the power take-off, the discharge valve-actuating means being an electrical solenoid connected in an electrical control circuit, said means associated with said valve-actuating means being a vacuum-operated switch which is operated by the motor of the vehicle, and said switch being electrically connected in the electrical circuit of the valve-actuating solenoid, whereby said switch is closed only when the motor of the vehicle is operating.

17. A control apparatus for a fluid containing tank having a discharge line extending therefrom and also having a main discharge valve and a discharge pump connected in said line, with a prime mover for actuating said discharge pump, said apparatus including, actuating means connected with the discharge valve for controlling operation thereof, actuating means connected with the prime mover for operating the pump, a single manually-operated element having connection with the valve actuating means and with the pump actuating means for simultaneously opening the discharge valve and operating the pump and for simultaneously closing the discharge valve and discontinuing operation of the pump, and means independent of the manually operated element and controlled by the prime mover which operates the pump for closing the discharge valve in the event that the operation of the engine is halted.

18. A control apparatus for a fluid containing tank having a discharge line extending therefrom and also having a main discharge valve and a discharge pump connected in said line, with a prime mover for actuating said discharge pump, said apparatus including, actuating means connected with the discharge valve for controlling operation thereof, actuating means connected with the prime mover for operating the pump, a single manually-operated element having connection with the valve actuating means and with the pump actuating means for simultaneously opening the discharge valve and operating the pump and for simultaneously closing the discharge valve and discontinuing operation of the pump, the valve-actuating means being vacuum-operated, and said valve-actuating means being connected with the prime mover which actuates the pump, whereby the discharge valve may be opened only when the prime mover is operating to actuate the pump and is automatically closed when the prime mover is not operating.

VICTOR E. LAGRANGE.
DANIEL J. PARMESAN.

References Cited in the file of this patent

UNITED STATES PATENTS

| Number | Name | Date |
| --- | --- | --- |
| 1,696,738 | Stedwell | Dec. 25, 1928 |
| 1,825,775 | Brubaker | Oct. 6, 1931 |
| 2,002,757 | Shand | May 28, 1935 |
| 2,037,020 | Holby | Apr. 14, 1936 |
| 2,037,021 | Holby | Apr. 14, 1936 |
| 2,182,969 | Madigan | Dec. 12, 1939 |
| 2,361,305 | Marmor | Oct. 24, 1944 |
| 2,366,925 | May | Jan. 9, 1945 |